(12) United States Patent
Bensmann

(10) Patent No.: US 11,338,904 B2
(45) Date of Patent: May 24, 2022

(54) FLIGHT CONTROL SURFACE ASSEMBLY

(71) Applicant: Airbus Operations GmbH, Hamburg (DE)

(72) Inventor: Stefan Bensmann, Hamburg (DE)

(73) Assignee: Airbus Operations GmbH

( * ) Notice: Subject to any disclaimer, the term of this patent is extended or adjusted under 35 U.S.C. 154(b) by 382 days.

(21) Appl. No.: 16/418,223

(22) Filed: May 21, 2019

(65) Prior Publication Data

US 2019/0359313 A1 Nov. 28, 2019

(30) Foreign Application Priority Data

May 23, 2018 (DE) ...................... 10 2018 112 388.4

(51) Int. Cl.
*B64C 9/02* (2006.01)
*B64D 45/00* (2006.01)

(52) U.S. Cl.
CPC ............ *B64C 9/02* (2013.01); *B64D 45/0005* (2013.01); *B64D 2045/001* (2013.01)

(58) Field of Classification Search
CPC .... B64C 9/02; B64C 9/04; B64C 9/16; B64C 9/20; B64C 9/22; B64C 9/26; B64D 45/0005; B64D 45/0001
See application file for complete search history.

(56) References Cited

U.S. PATENT DOCUMENTS

| | | | |
|---|---|---|---|
| 8,152,110 B2 | 4/2012 | Schlegel et al. | |
| 8,950,705 B2* | 2/2015 | Schievelbusch ... | B64D 45/0005 244/99.3 |
| 2010/0038493 A1 | 2/2010 | Lang et al. | |
| 2015/0321747 A1* | 11/2015 | Recksiek .................. | B64C 9/02 244/201 |
| 2019/0233081 A1* | 8/2019 | Budnitsky ................. | B64C 9/16 |

FOREIGN PATENT DOCUMENTS

| | | |
|---|---|---|
| DE | 102007046707 A1 | 4/2009 |
| EP | 1982916 A2 | 10/2008 |
| EP | 2965993 A1 | 1/2016 |
| KR | 20100038493 A * | 4/2010 |

* cited by examiner

*Primary Examiner* — Joshua J Michener
*Assistant Examiner* — Cindi M Curry
(74) *Attorney, Agent, or Firm* — Lerner, David, Littenberg, Krumholz & Mentlik, LLP

(57) ABSTRACT

A flight control surface assembly adapted to be mounted to a main wing of an aircraft includes a flight control surface having a first portion and a second portion spaced from each other, a connection assembly adapted for movably connecting the flight control surface to the main wing, such that the flight control surface is selectively movable in a predetermined movement between a retracted position and an extended position with respect to the main wing, and for each of the flight control surface, a first roller with a first axial face and a second roller with a second axial face facing the first axial face mounted rotatably and coaxially. with a gap between the first and second axial end faces. A biasing mechanism biasing the first and second rollers towards each other, and a transmission mechanism coupled between the flight control surface and the rollers are included.

15 Claims, 5 Drawing Sheets

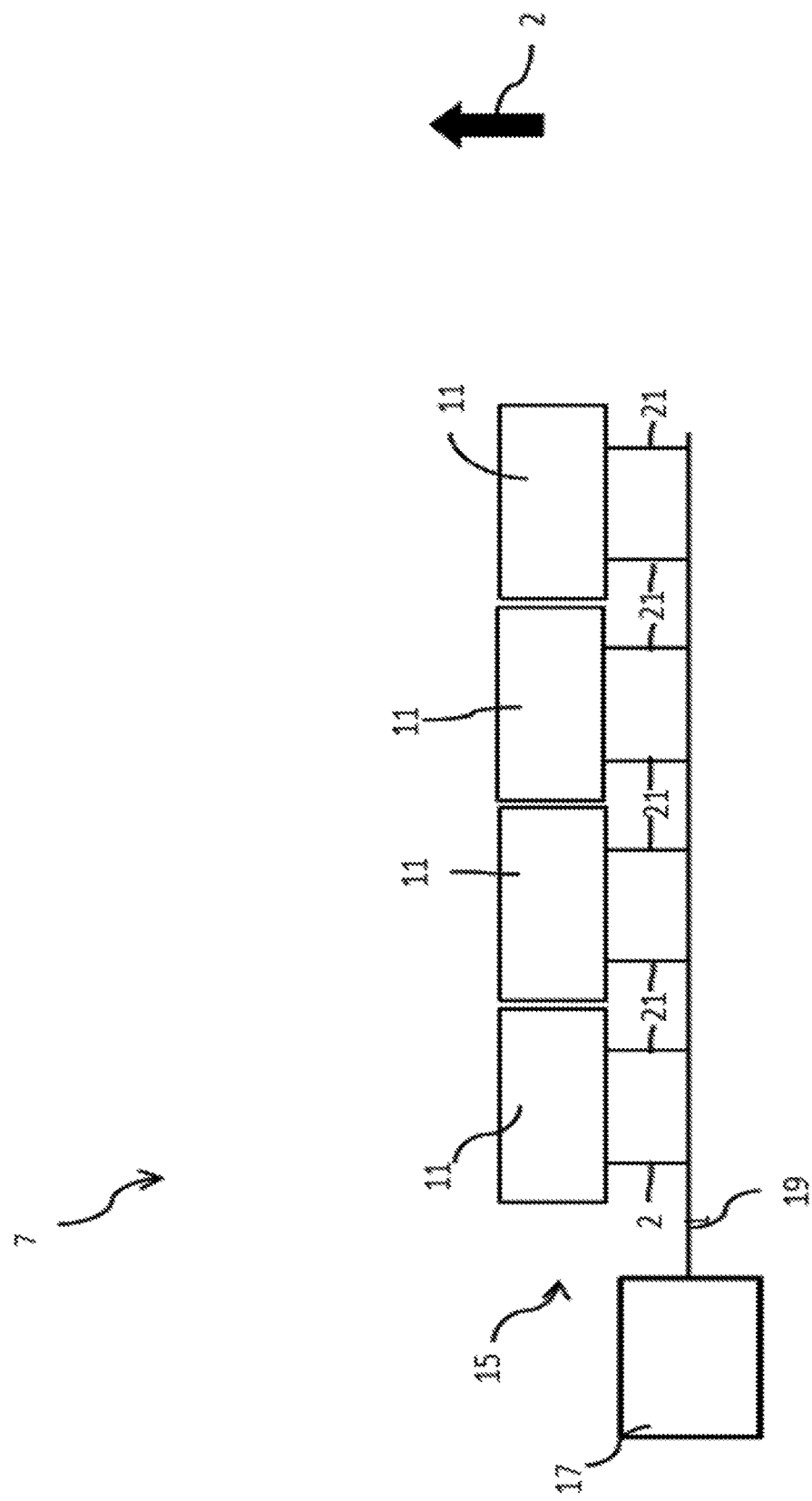

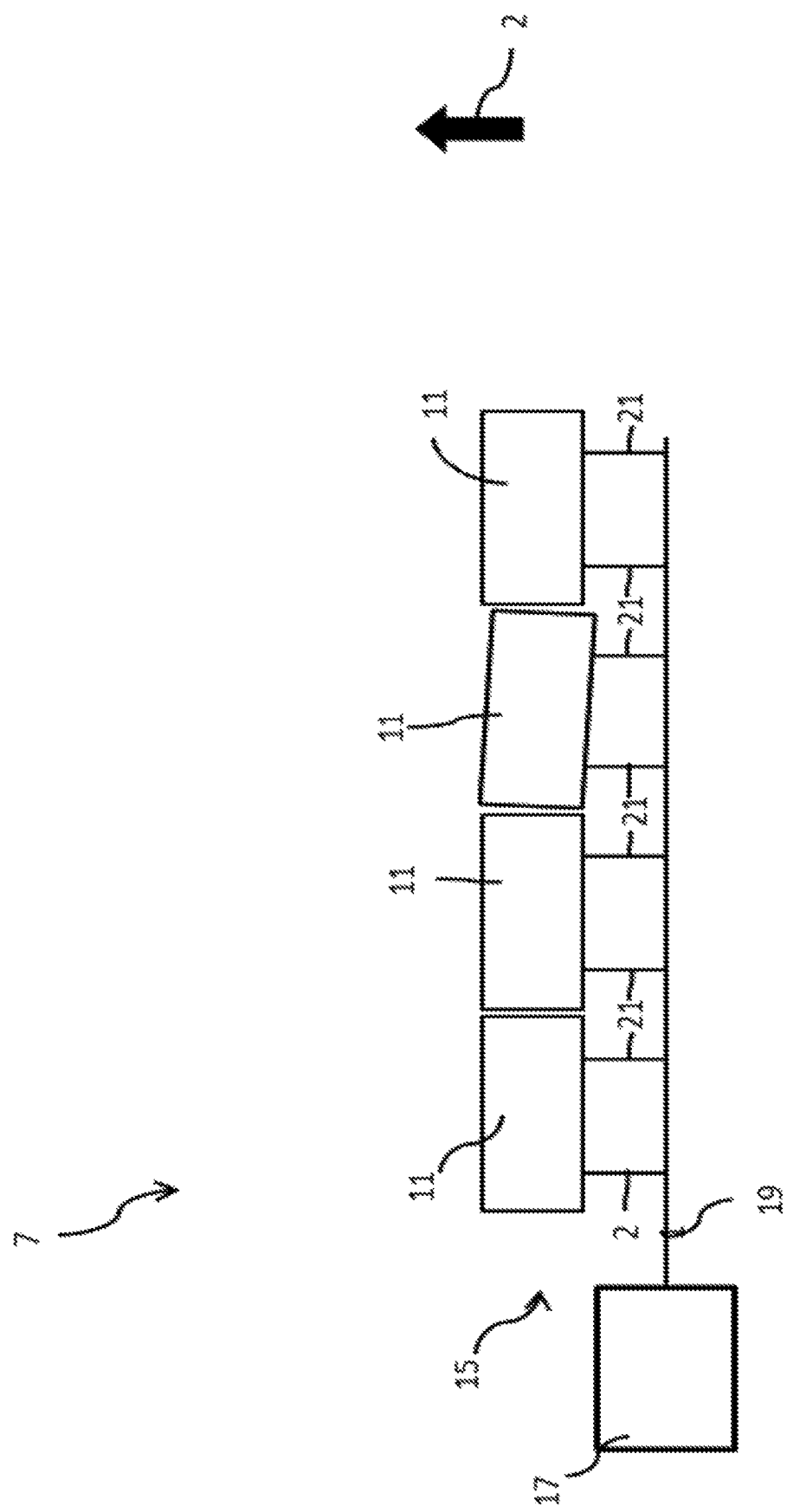

FLIGHT CONTROL SURFACE ASSEMBLY

FIELD OF THE INVENTION

The present application relates to a flight control surface assembly, such as a leading edge slat assembly.

An embodiment of the leading edge slat assembly comprises one or more flight control surface having a first portion and a second portion spaced from each other, a connection assembly adapted for movably connecting the one or more flight control surfaces to a main wing of an aircraft, such that each of the flight control surfaces is selectively movable in a predetermined movement between a retracted position and an extended position with respect to the main wing.

BACKGROUND OF THE INVENTION

In order to be able to selectively vary the degree of lift provided by an aircraft wing, aircraft wings are typically provided with aerodynamic or flight control surfaces which are movably coupled to a main wing such that they can be moved between a retracted or stowed position, in which they are disposed within or directly on the main wing, and at least one extended or deployed position, in which they are extended from the main wing. Slats are an example for such movable flight control surfaces disposed at and extendible from the leading edge of the main wing.

Flight control surfaces are often provided in groups of multiple flight control surfaces arranged side by side. All flight control surfaces of such a group are operatively coupled to a common drive arrangement and are adapted to be moved together between the retracted and extended positions while carrying out a common predetermined synchronous movement between the retracted and extended positions upon operation of the drive arrangement. In other words, during operation of the drive arrangement all of the flight control surfaces are moved simultaneously and in parallel and each of the flight control surfaces moves along a predetermined nominal path. This corresponds to a normal operating condition.

In order to be able to safely take up increased forces which may occur within the assembly in a fault state, in which one of the flight control surfaces deviates considerably from its predetermined movement, the mounting structures between the flight control surfaces and the main wing are typically constructed to be of a very high reliability. However, this approach is associated with relatively high costs and with a relatively high complexity and/or weight. It is therefore generally desirable to provide for a detector arrangement which is adapted to detect the occurrence of such a fault state and to then stop any further movement of the flight control surfaces. The aircraft is able to safely fly, irrespective of the position of the flight control surfaces, albeit with a somewhat decreased efficiency.

An example of a fault state of the above type is skewing of a slat of a slat assembly. Slats are commonly mounted to the main wing by means of a plurality of elongate slat tracks. Each slat track is movable with respect to the main wing between a retracted position corresponding to the stowed position of the slat and an extended position corresponding to the deployed position of the slat. The movement of the slat tracks between the retracted and extended positions is effected by means of a drive arrangement. For example, such a drive arrangement may comprise a drive shaft, which is rotatably driven by a rotary actuator and which is coupled to each of the slat tracks via a respective transmission or gearbox converting the rotary movement of the drive shaft into a synchronous translatory movement of the slat tracks along their longitudinal extension. The connection between the slat tracks and the main bodies of the slats is typically realized by joints, which comprise a plurality of spherical bearings, such that some degree of movement of the main body of the slat with respect to the slat tracks is possible, so that minor changes in the position and the geometry of the main body of the slat with respect to the slat tracks can be compensated for and that there is at least some degree of decoupling between deformation of the slat and deformation of the main wing. A relative change in the position of the main body of the slat with respect to the slat tracks may occur, for example, in the event that the slat tracks of a single slat are not moved synchronously, i.e. in case of a differential movement of the slat tracks, resulting in skewing of the slat, and may be accommodated by the joints configured in the above manner. However, the arrangement of spherical bearings used in the joints, typically together with multiple links, is relatively complex and expensive and assumes a considerable amount of space.

BRIEF SUMMARY OF THE INVENTION

Aspects of the present invention may provide a flight control surface assembly of the above type, which is of a simple and cost-efficient construction and which is nevertheless able to address a fault state in which one of the flight control surfaces deviates considerably from its predetermined nominal path.

According to an embodiment of the present invention, a flight control surface assembly, which may be, in particular, a leading edge slat assembly, is provided with is adapted to be mounted to a main wing of an aircraft. The flight control surface assembly comprises one or more flight control surfaces, each having a first portion and a second portion spaced from each other. The flight control surfaces may be trailing edge flight control surfaces, or the flight control surfaces may be leading edge flight control surfaces, such as in particular, e.g., slats. In case of more than one flight control surface the flight control surfaces may, in particular, be arranged side by side in a row.

An embodiment of the flight control surface assembly further comprises a connection assembly adapted for movably connecting the one or more flight control surfaces to a main wing of an aircraft, such that each of the flight control surfaces is selectively movable in a predetermined movement between a retracted position and an extended position with respect to the main wing and, in particular, with respect to a leading edge or a trailing edge of the main wing, depending on whether the assembly is a leading edge or a trailing edge flight control surface assembly. In the extended position a leading or trailing edge of the flight control surface is at a greater distance from the leading edge or trailing edge, respectively, of the main wing than in the retracted position. The predetermined movement is the movement in the normal operating state and defines for each of the flight control surfaces a nominal movement path. In the case of multiply flight control surfaces, they are preferably adapted to be selectively moved simultaneously and parallel between the retracted and extended positons.

Preferably the flight control surface assembly also comprises a drive arrangement, which is operatively coupled to the connection assembly and operable to effect the predetermined movement of the one or more flight control surface between the retracted position and the extended position. The flight control surface assembly then preferably also comprises a control unit connected to the drive arrangement and adapted to control operation of the drive arrangement. Thus, in particular when controlled by the control unit, the drive arrangement, which may comprise, e.g., one or more rotary or linear actuators, linkages and/or shafts, operates and thereby causes the flight control surfaces to carry out the predetermined movement. It should be noted that during flight various forces act on the flight control assembly, such as forces due to normal bending of the wings, so that the actual movement carried out by the flight control surfaces typically slightly deviates from the predetermined movement.

In any case, an embodiment of the flight control surface assembly also comprises, separately for each of the flight control surfaces, a first roller and a second roller mounted rotatably and coaxially. Thus, they are rotatable about a common axis of rotation or their axes of rotation coincide. For example, the first and second rollers may be mounted on a common shaft or on separate shafts. The first roller has a first axial end face, and the second roller has a second axial end face. The first and second axial end faces face each other with a gap between them.

Further, an embodiment of the flight control surface assembly comprises, separately for each of the flight control surfaces, a detector and a biasing mechanism biasing the first and second rollers towards each other, i.e., in the axial direction. Thus, the first and second axial end faces are biased towards each other.

Moreover, an embodiment of the flight control surface assembly comprises, separately for each of the flight control surfaces, a transmission mechanism which is coupled between the flight control surface and the first and second rollers such that movement of the flight control surface between the retracted and extended positions causes the first and second rollers to rotate in such a manner that the rotation of the first roller corresponds to the movement of the first portion of the flight control surface, the rotation of the second roller corresponds to the movement of the second portion of the flight control surface and the first and second rollers rotate synchronously, i.e. with a constant relative angle of rotation, when the flight control surface carries out the predetermined movement. The correspondence means that any change of position of the first and second portions of the flight control surface during the predetermined movement causes a corresponding rotation of the first and second rollers, i.e. when the flight control surface carries out the predetermined movement the rotation of the first roller is a function of the movement of the first portion and the rotation of the second roller is a function of the movement of the second portion. The correspondence may be a predetermined relationship or function between the positions of the first and second portions and the angular positons of the first and second rollers. For example, the translational movement of the flight control surface—or more specifically the first and second portions thereof—may be translated into a corresponding rotation of the first and second rollers, or a rotation of two rotary drive elements effecting the movement of the flight control surface between the retracted and extended positions may be transferred to the first and second rollers. Preferably, the direction of rotation of the first and second rollers depends on the direction of movement of the first and second portions, i.e. on whether the flight control surface moves from the retracted to the extended position or vice versa.

For each of the first and second rollers, the first axial end face comprises a cam surface portion and the second axial end face comprises one or more projecting elements arranged in a fixed position on the second axial end face and in contact with the cam surface portion. Thus, when the second roller rotates the one or more projecting elements rotate together with the second roller about the axis of rotation of the second roller, while being forced into contact with the cam surface portion of the first roller by the biasing arrangement. As long as the first and second rollers rotate synchronously, the one or more projecting elements are in contact with constant locations of the cam surface portion. However, when the relative angular position of the first and second rollers changes due to deviation of one of the first and second portions of the flight control surface from its path corresponding to the predetermined movement, the locations of contact change, i.e. the one or more projecting elements travel along the cam surface portion while maintaining contact with the cam surface portion.

The cam surface portion is shaped such that the width of the gap is minimum when the first and second rollers have a predetermined relative angular position corresponding to the predetermined movement and that the width of the gap continuously increases with an increasing deviation from the predetermined relative angular position. Thus, the shape of the cam surface portion is such that upon a difference in rotational speed of the first and second rollers, i.e. upon the first and second rollers rotating asynchronously, the one or more projecting elements travels along and in contact with the cam surface portion, and the cam surface portion pushes the one or more projecting elements and, thus, the second roller, away from the first roller. It should be noted that, conversely, when the first and second rollers again reach the predetermined relative angular position, the width of the gap decreases again due to the biasing force of the biasing mechanism. The first and second rollers may be mounted such that the axial position of one of the first and second rollers is fixed and the other one of the first and second rollers moves in the axial direction upon change of the width of the gap, or such that both of the first and second rollers move axially upon change of the width of the gap.

The detector is adapted to provide a detection signal indicative of whether or not the width of the gap exceeds a predetermined threshold. The detection signal may be, e.g., a measurement signal indicative of the current width of the gap, or a signal only indicating exceeding the threshold. In the latter case the detector may be a switch which is mounted such that it is actuated by a portion of the first or second roller when the first and/or second roller moves and the width of the gap reaches the predetermined threshold.

This configuration is very simple and can be configured to not being influenced by wing bending, i.e. the risk of false alarms caused by wing bending can be reduced. For example, skewing of a flight control surface, such as a slat, can be reliably detected. As compared to mechanical solutions for preventing excessive deviations from the predetermined synchronous movement and, in particular, skewing of a flight control surface or slat, the weight of the assembly is considerably reduced. The assembly also has the advantage that it is very simple to produce and to install and to maintain. For example, a flight control surface can be easily removed and install, because it is merely necessary to disconnect and to connect, respectively, the transmission mechanism from and to the flight control surface, e.g. the first and second wire-shaped elements mentioned below. Further, the detection signals of all of the flight control surfaces can be fed to a single detection or control unit, which evaluates the detection signals and takes appropriate steps.

In a preferred embodiment, for each of the at least one flight control surface the first portion and the second portion are spaced in a span direction of the respective flight control surface. For example, the first portion may be a first track, such as a slat track in the case of the flight control surface being a slat, and the second portion is a second track, such as a slat track in the case of the flight control surface being a slat. The first and second tracks then extend from a main body of the flight control surface and are movably connected to the connection assembly.

In a preferred embodiment, for each of the at least one flight control surface one or more or all of the one or more projecting elements are integrally formed in one piece with the second axial end face or another portion of the second roller. Alternatively, or in combination with this embodiment, one or more or all of the one or more projecting elements are an element which is separate from the second roller and is retained in the fixed position on the second axial end face. In the latter case, each of the projecting elements, which is an element separate from the second roller, is preferably a ball rotatably held in an associated recess in the second axial end face. Configuring the projecting elements in this manner as a ball provides the advantage that the projecting elements can roll on the cam surface portion, so that friction and wear between the projecting elements and the cam surface portion are reduced.

In a preferred embodiment, the flight control surface assembly further comprises a detection unit, which is connected to the detector associated with each of the one or more flight control surfaces and which is adapted to receive the detection signal from each of the detectors and to evaluate the detection signals to determine if for one of the at least one flight control surface the width of the gap has exceeded the predetermined threshold and to provide a predetermined control signal if it is determined that for one of the at least one flight control surface the width of the gap has exceeded the predetermined threshold. The predetermined control signal indicates that the predetermined threshold has been exceeded by one of the flight control surfaces. The connection between the detectors and the detection unit may advantageously be effected via loose cables to account for wing bending.

In a preferred embodiment, the transmission mechanism of each of the one or more flight control surfaces comprises a first and a second wire-shaped element, each coupled mechanically at one end thereof to the associated flight control surface to move under mechanical tension along their length together with the flight control surface upon movement thereof between the retracted and extended positions. The coupling is such that the movement of the first wire-shaped element along its length corresponds to—i.e. is related to, is a function of or is synchronized with—the movement of the first portion of the flight control surface and the movement of the second wire-shaped element along its length corresponds to—i.e. is related to, is a function of or is synchronized with—the movement of the second portion of the flight control surface. The first and second wire-shaped elements may be coupled directly or indirectly to the flight control surface, e.g. directly to the flight control surface, indirectly via separate components which are in turn connected to the flight control surface, or to a drive component, such as an actuator, adapted to drive the predetermined movement of the flight control surface. In particular, the first and second wire-shaped elements may be coupled directly to the first portion and the second portion, respectively, such as to two tracks, e.g. slat tracks in the case of slats, or to two portions of the main body of the flight control surface. Generally, the first and second wire-shaped elements are elongate flexible elements, such as wires, cables or belts, and have an arbitrary cross-section, but preferably a circular cross-section. The first wire-shaped element is guided at least partially around the first roller and the second wire-shaped element is guided at least partially around the second roller to effect the rotation of the first and second rollers. The rotation of the rollers is effected due to a torque applied by the wire-shaped elements when they move together with the flight control surface. The synchronous rotation of the first and second rollers when the flight control surface carries out the predetermined movement may be set in a simple manner by, e.g., choosing suitable diameters of the first and second rollers. This embodiment provides the advantage that due to the use of the wire-shaped elements it is particularly simple to reduce or avoid an influence of wing bending on the detection.

In this embodiment, in which the transmission mechanism of each of the one or more flight control surfaces comprises a first and a second wire-shaped element, it is further preferred if the transmission mechanism comprises a tensioning mechanism which is adapted to maintain the first and second wire-shaped elements under tension by biasing them towards a position corresponding to the retracted position of the flight control surface. Upon moving the flight control surface from the retracted position to the extended position the first and second wire-shaped elements then move against the biasing force of the tensioning mechanism. The tensioning mechanism may preferably comprise a first spring-loaded reel onto which the first wire-shaped element is reeled and a second spring-loaded reel onto which the second wire-shaped element is reeled. Thus, upon moving the flight control surface from the retracted position to the extended position the first and second wire-shaped elements are then uncoiled from the first and second spring-loaded reels against the respective spring-load, and upon moving in the opposite direction the first and second wire-shaped elements are automatically coiled up under tension onto the first and second spring-loaded reels. These first and second spring-loaded reels may preferably be rollers separate from the first and second rollers, and the first and second rollers are then located, along the length of the first and second wire-shaped elements, between the flight control surface and the first and second spring-loaded reels. Alternatively, the first and second spring-loaded reels may be constituted by the first and second rollers, i.e. the first and second rollers may be the first and second spring-loaded reels.

In the above embodiments, in which the transmission mechanism of each of the one or more flight control surfaces comprises a first and a second wire-shaped element, it is further preferred if the transmission mechanism of each of the at least one flight control surface further comprises a first deflection pulley and a second deflection pulley. The first deflection pulley is arranged, along the length of the first wire-shaped element, between the flight control surface and the first roller such that the first wire-shaped element is guided at least partially around the first deflection pulley and extends between the flight control surface and the first deflection pulley in a chord direction of the flight control surface. Similarly, the second deflection pulley is arranged, along the length of the second wire-shaped element, between the flight control surface and the second roller such that the second wire-shaped element is guided at least partially around the second deflection pulley and extends between the flight control surface and the second deflection pulley in a chord direction of the flight control surface. This provides the advantage, that when the flight control surface is mounted to a wing of an aircraft, the first and second wire-shaped elements extend from the flight control surface in the flight direction or chord direction of the wing, and that the first and second deflection pulleys can be arranged such that the first and second wire-shaped elements extend along the neutral axis of the wing between the first and second deflection pulleys and the first and second rollers, so that the influence of wing bending on the detection is reduced or even eliminated altogether in a very simple and reliable manner. Therefore, the triggering tolerances can be set to a low value and the risk of false alarms is reduced.

According to the present invention a wing of an aircraft is also provided, which wing comprises a main wing and a flight control surface assembly having any of the above-described configurations. The flight control surface assembly is mounted to the main wing by means of the connection assembly in the manner already described above such that the predetermined movement of the flight control surfaces with respect to the main wing between the retracted position and the extended position, e.g. by a drive arrangement operable to effect this movement.

In a preferred embodiment of the wing, in which the flight control surface assembly is configured in accordance with the above-described embodiment comprising first and second deflection pulleys, for each of the flight control surfaces the first deflection pulley is arranged such that the first wire-shaped element extends between the flight control surface and the first deflection pulley in the chord direction of the wing, and the first wire-shaped element extends between the first deflection pulley and the first roller along a neutral axis of the wing, i.e., an axis of minimum wing bending. Similarly, the second deflection pulley is arranged such that the second wire-shaped element extends between the flight control surface and the second deflection pulley in the chord direction of the wing, and the second wire-shaped element extends between the second deflection pulley and the second roller along the neutral axis of the wing. Consequently, with this arrangement the influence of wing bending on the detection is reduced or even eliminated altogether in a very simple manner, as already mentioned above. For this purpose, it may also be advantageous to arrange the axes of rotation of the first and second rollers on or along the neutral axis of the wing.

The present invention also provides an aircraft comprising a wing according to any of the above-described embodiments.

In the following an exemplary embodiment of the slat assembly and of a wing including the slat assembly will be described in more detail with reference to the drawings.

BRIEF DESCRIPTION OF THE DRAWINGS

FIG. 2a shows a schematic block diagram of a portion of an embodiment of a flight control surface assembly of the invention in a normal operating state.

FIG. 2b shows a schematic block diagram of the portion of the embodiment of the flight control surface assembly of FIG. 2a in a fault state.

DETAILED DESCRIPTION

Figure 1:
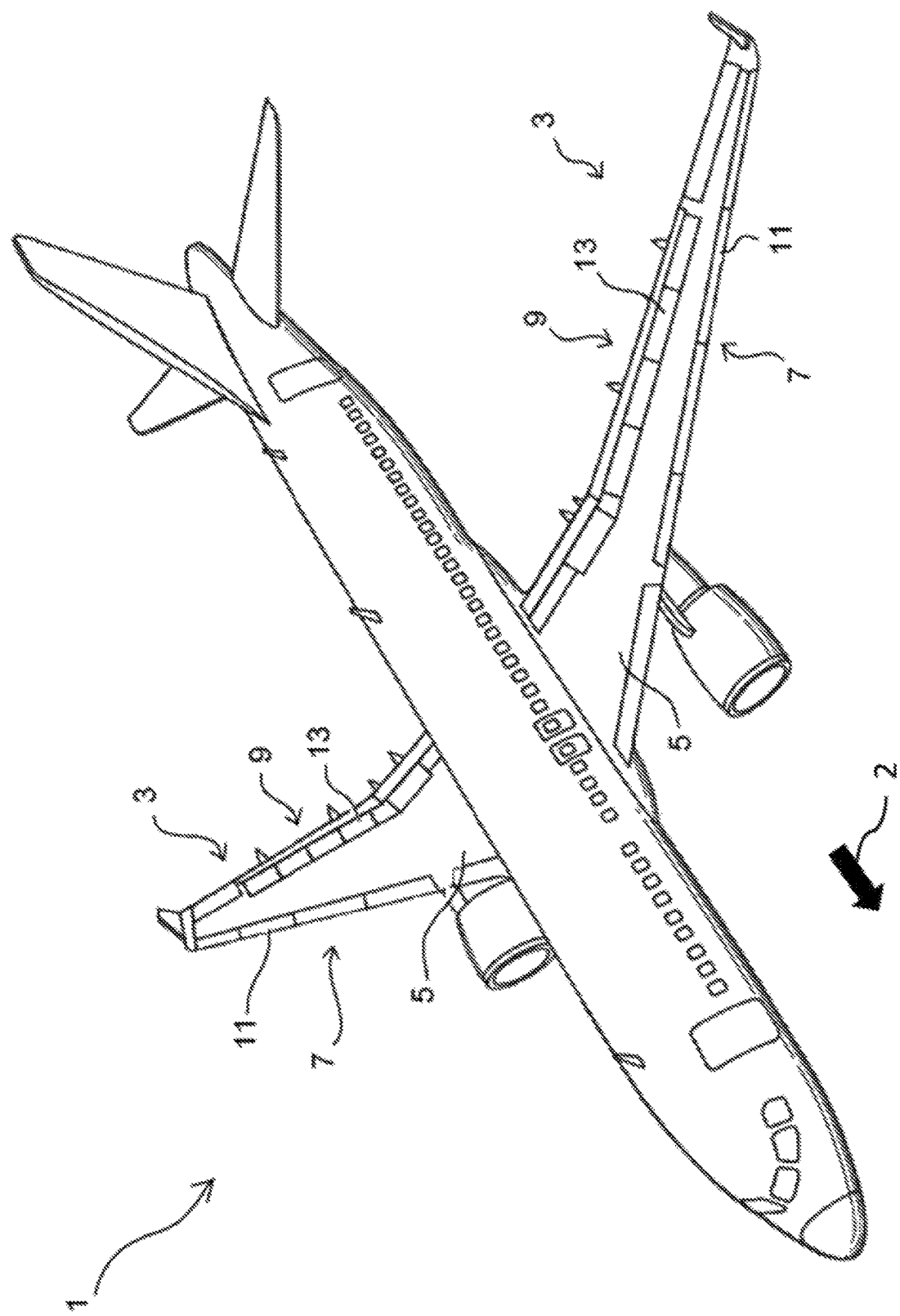
FIG. 1 shows a schematic perspective view of an aircraft with wings comprising a flight control surface assembly according to the invention, wherein the flight control surfaces are shown in the retracted or stowed position.

In FIG. 1 an aircraft 1 comprising two wings 3 is shown. Each of the wings 3 comprises a main wing 5 and two flight control surface assemblies, namely a leading edge flight control surface assembly in the form of a slat assembly 7, and a trailing edge flight control surface assembly in the form of a flap assembly 9. Each of the slat assemblies 7 comprises four flight control surfaces in the form of slats 11, which are arranged side by side in a row, and each of the flap assemblies 9 comprises four flight control surfaces in the form of flaps 13, which are likewise arranged side by side in a row. In FIG. 1 the slats 11 and flaps 13 are shown in a retracted or stowed position in which the leading edges of the slats 11 are essentially aligned with the leading edges of the main wings 5 and the trailing edges of the flaps 13 are essentially aligned with the trailing edges of the main wings 5. The arrow 2 indicates the flight direction, i.e. when moving the slats 11 into the extended position they are moved with respect to the main wing 5 in the flight direction 2, and when moving the slats 11 into the retracted position they are moved with respect to the main wing 5 against the flight direction 2. The slats 11 and flaps 13 or each of the assemblies 7, 9 are mounted to the respective main wing 5 such that they can be driven to carry out a predetermined movement between the retracted position and an extended or deployed position (not shown). In other words, when moving between the retracted position and the extended position, each of the slats 11 and flaps 13 follows a predetermined nominal movement path in a predetermined nominal orientation.

For this purpose, as schematically illustrated in FIGS. 2a and 2b, which show an embodiment of one of the slat assemblies 7 of FIG. 1, a drive arrangement 15 is provided, which includes a rotary actuator 17 and a rotatable drive shaft 19 driven by the rotary actuator 17. Each of the slats 11 is mounted to the respective main wing 5 by means of first and second portions in the form of first and second elongate arcuate slat tracks or support elements 21, respectively, which are extending parallel to each other and are spaced from each other in the spanwise direction of the respective slat 11. The two planes associated with the two slat tracks 21 are parallel to each other. A distal end of each of the slat tracks 21 is connected to the main body of the slat 11. The slat tracks 21 each extend into the main wing 5 and are mounted in the main wing 5 to be movable along an arc in the respective planes and defined by the arcuate shape of the slat track 21 between the retracted position, in which the slat 11 is in its stowed position, and an extended position, in which the slat 11 is in its deployed position. Upon operation of the rotary actuator 17 the drive shaft 19 is driven to rotate, thereby effecting movement of the slat tracks 21 and, thereby, the entire slats 11 between the extended and retracted positions.

Importantly, upon operation of the actuator 17 the slat tracks 21 define a predetermined synchronous movement of the slats 11 during which each of the slats 11 moves along a predetermined path having a predetermined relative position and orientation with respect to the main wing 5. For example, throughout the movement between the retracted and extended positions the slats 11 may maintain or essentially maintain their relative arrangement shown in FIG. 2a. However, it is to be noted that slight deviations from this predetermined movement typically occur due to forces occurring during normal flight, as already explained above.

Figure 3:
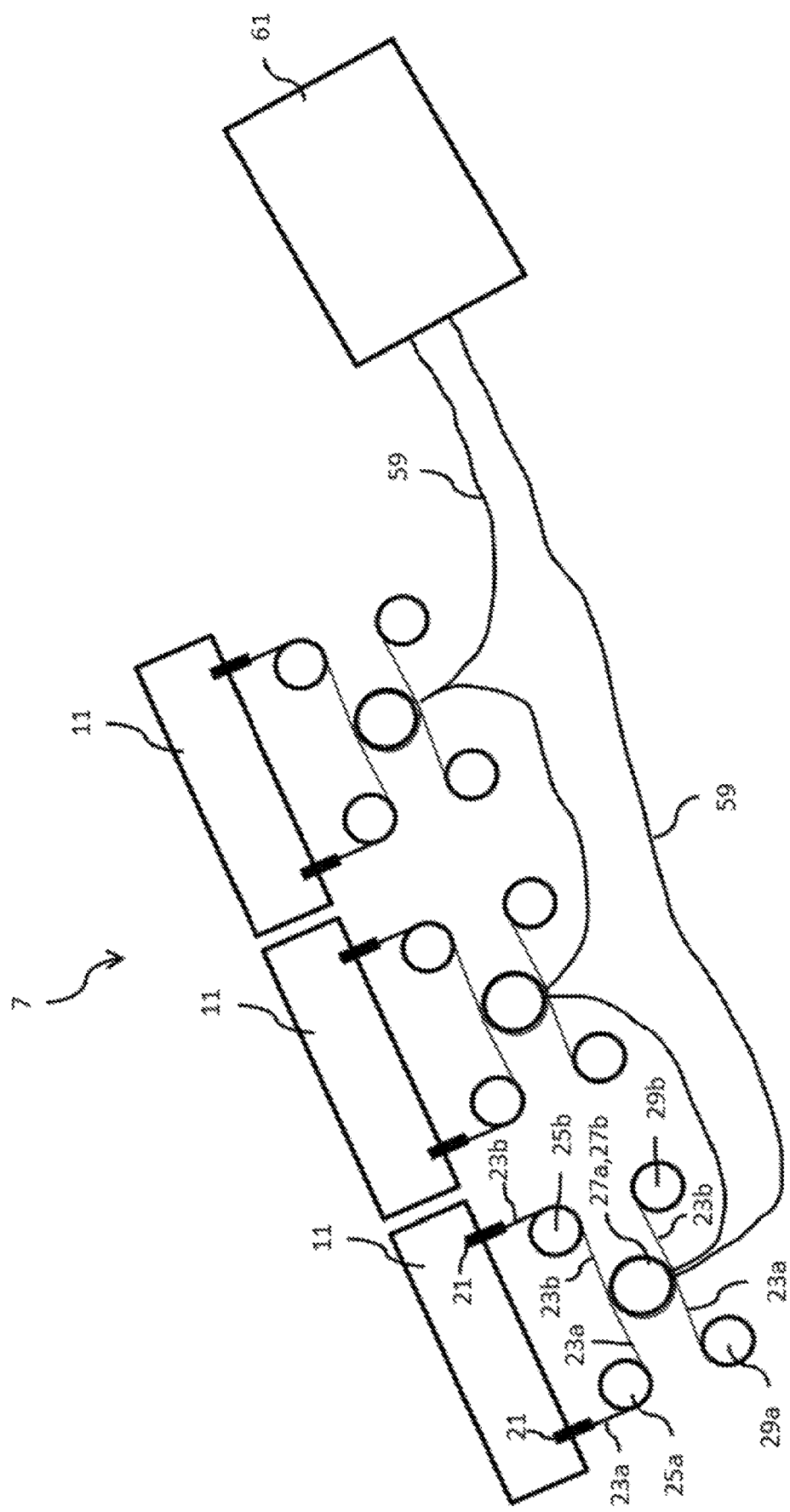
FIG. 3 shows another schematic block diagram of the embodiment of a flight control surface assembly of FIGS. 2a and 2b in a normal operating state.

FIG. 3 shows further details of the slat assembly 7 of FIG. 2a, wherein the drive arrangement has been left away for ease of illustration and only three of the slats 11 are shown. For each of the slats 11 the slat assembly 7 comprises a wire or wire-shaped element 23a connected at one end to one of the slat tracks 21, a wire or wire-shaped element 23b connected at one end to the other one of the slat tracks 21, first and second rotatably mounted deflection pulleys 25a, 25b, first and second coaxially arranged, rotatably mounted rollers 27a, 27b (only one of them is visible in FIG. 3, but see FIG. 4), and first and second rotatably mounted reels 29a, 29b. The end portion of the wire 23a opposite the slat track 21 is reeled or coiled up on the reel 29a, and the end portion of the wire 23b opposite the slat track 21 is reeled or coiled up on the reel 29b. The reels 29a, 29b are spring-loaded in the coiling up direction, so that the wires 23a, 23b are maintained under tension along their length. The first and second wires 23a, 23b define a transmission mechanism. The first and second rotatably mounted reels 29a, 29b define a tensioning mechanism.

When starting from the slat track 21, the wire 23a is guided around the deflection pulley 25a, then around the roller 27a and finally around the reel 29a, and the deflection pulley 25a is arranged such that the wire 23a extends from the slat track 21 in the cord direction of the slat 11, is then deflected by 90° at the deflection pulley 25a, so that it extends in the span-wise direction of the slat 11 between the deflection pulley 25a and the roller 27a. Similarly, when starting from the slat track 21, the wire 23b is guided around the deflection pulley 25b, then around the roller 27b and finally around the reel 29b, and the deflection pulley 25b is arranged such that the wire 23b extends from the slat track 21 in the cord direction of the slat 11, is then deflected by 90° at the deflection pulley 25b, so that it extends in the span-wise direction of the slat 11 between the deflection pulley 25b and the roller 27b. Thus, when the slat 11 is extended and retracted, the wires 23a, 23b move under tension along their length under tension together with the slat 11—or, more precisely, together with the slat track 21 to which they are connected—while rotating the rollers 27a, 27b, so that the rotation of the rollers 27a, 27b corresponds to the translational movement of the respective slat track 21. The rollers 27a, 27b are configured such that they rotate synchronously with a constant predetermined relative angular position if the slat 11 carries out its predetermined movement. However, upon deviating from this predetermined movement, the rotation of the rollers 27a, 27b becomes asynchronous, so that their relative angular position changes.

Figure 4:
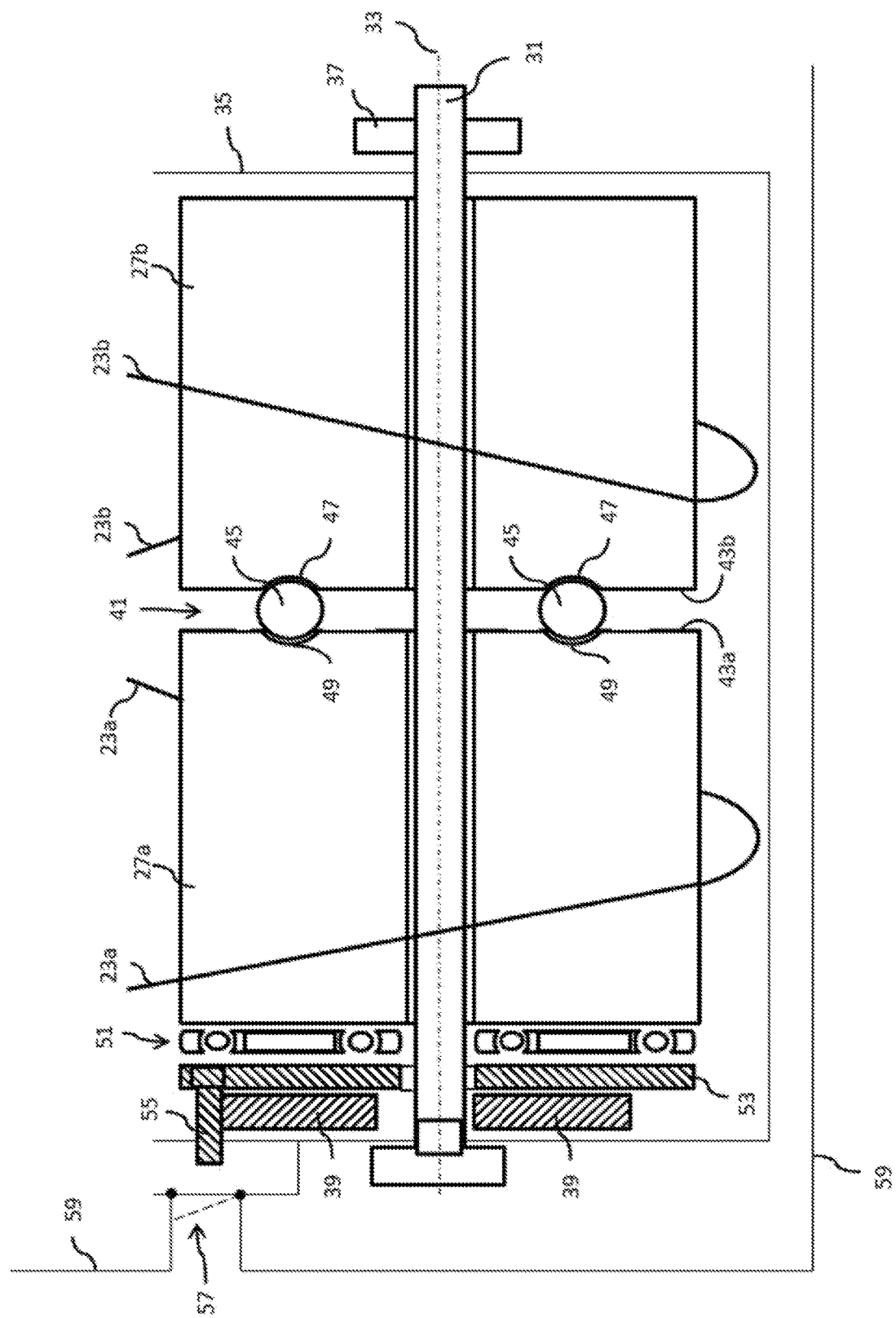
FIG. 4 shows a schematic cross-sectional view of a first and a second roller of the flight control surface assembly of FIG. 3.

FIG. 4 shows a cross-sectional view of the two rollers 27a, 27b. As can be seen in FIG. 4, the rollers 27a, 27b are rotatably mounted on a common shaft 31, such that they have a common axis of rotation 33. The rollers 27a, 27b are arranged in a housing 35, and the shaft 31 is fixedly secured to the housing 35 by two nuts 37. Both rollers 27a, 27b are axially movable along the shaft 31 and are biased to the right in FIG. 4 by a biasing mechanism, for example, a compression spring 39. Thus, the rollers 27a, 27b are always positioned as far to the right as possible inside the housing 35. However, there is always a gap 41 between the two facing end faces 43a, 43b of the rollers 27a, 27b, which gap 41 is maintained by a plurality of projecting elements in the form of balls 45 (only two are visible in FIG. 4) disposed between and in contact with the end faces 43a, 43b.

Each of the balls 45 is retained in a fixed positon with respect to the end face 43b in a corresponding depression 47 provided in in the end face 43b. Further, each of the balls 45 contacts the opposite end face 43a in an elongate groove 49, defining a cam surface portion, provided in the end face 43a. The groove 49 is configured such that the ball 45 moves along the groove 49 in case of an asynchronous rotation of the two rollers 27a, 27b. Further, the depth of the groove 49 changes along its length such that it has a maximum depth at one location and the depth decreases to both sides of this location. When the two rollers 27a, 27b have the predetermined relative angular position, each of the balls 45 contacts the end face 43a at the location of maximum depth of the respective groove 49, so that the size of the gap 41 then has a minimum value. However, with increasing deviation from the predetermined relative angular position, the balls 45 travel up a ramp in the groove 49, so that the size of the gap 41 increases. In that case, the roller 27a increasingly moves to the left in FIG. 4 along the shaft 31.

The compression spring 39 is arranged between the housing 35 and a plate 53, and a ball bearing 51 is disposed between the plate 53 and the roller 27a (a similar ball bearing is disposed between the roller 27b and the housing 35 but not shown in FIG. 4). A pin 55 is fixedly secured to and extends to the left from the plate 53. When the gap 41 has its minimum size, the pin 55 is spaced from a switch 57, which is provided in an electric line 59 and interconnects in a loop and in series the switches 57 of the rollers 27a, 27b of the slats 11 of the slat assembly 7 and a detection unit 61, wherein the pin 55 and the switch 57 forms a detector. The switch 57 is normally closed, so that the detection unit 61 normally detects a closed electric circuit. However, if the size of the gap 41 of one of the pairs of rollers 27a, 27b exceeds a predetermined threshold, the pin 55 reaches the corresponding switch 57 and opens it, so that the detection unit 61 detects interruption of the electric circuit indicating that the deviation of the relative angular position from the predetermined relative angular position has exceeded a threshold for at least one of the pairs of rollers 27a, 27b.

FIG. 2b schematically illustrates a fault state of the slat assembly 7 of FIGS. 2a and 3. In the fault state one of the slats 11 is skewed with respect to the other slats 11 and the main wing 5 and therefore significantly deviates from the predetermined movement during operation of the actuator 17. Due to the skewed position of the slat 11, the relative angular position of the associated rollers 27a, 27b deviates from the predetermined relative angular position, and when the skewing reaches a threshold, the associated switch 57 is opened as explained above. Therefore, the detection unit 61 detects interruption of the electric circuit.

The threshold is chosen such that slight deviations of the slats 11 from the predetermined movement occurring during normal flight do not cause opening of the switches 57, but that only skewing or another minimum deviation corresponding to a fault state causes interruption of the electric circuit. Upon detecting that the electric circuit is interrupted, the detection unit 61 outputs via control line a control signal to the actuator 17, which control signal controls the actuator 17 to stop actuation, thereby stopping further movement of the slats 11.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight control surface assembly configured to be mounted to a main wing of an aircraft and comprising:
   at least one flight control surface having a first portion and a second portion spaced from each other;
   a connection assembly configured for movably connecting the at least one flight control surface to a main wing of an aircraft, such that each of the at least one flight control surface is selectively movable in a predetermined movement between a retracted position and an extended position with respect to the main wing,
   separately for each of the at least one flight control surface, the connection assembly comprising:
      a first roller and a second roller mounted rotatably and coaxially, wherein the first roller has a first end face and the second roller has a second end face facing the first end face with a gap between the first and second end faces;
      a detector;
      a biasing mechanism biasing the first and second rollers towards each other; and
      a transmission mechanism coupled between the flight control surface and the first and second rollers such that a movement of the flight control surface between the retracted and extended positions is configured to cause the first and second rollers to rotate in such a manner that the rotation of the first roller corresponds to the movement of the first portion, the rotation of the second roller corresponds to the movement of the second portion and the first and second rollers rotate synchronously when the flight control surface carries out the predetermined movement,
      wherein the first end face comprises a cam surface portion and the second end face comprises at least one projecting element arranged in a fixed position on the second end face and in contact with the cam surface portion, wherein the cam surface portion is shaped such that the width of the gap is minimum when the first and second rollers have a predetermined relative angular position corresponding to the predetermined movement and that the width of the gap continuously increases with an increasing deviation from the predetermined relative angular position,
      wherein the detector is configured to provide a detection signal indicative of whether or not the width of the gap exceeds a predetermined threshold.

2. The flight control surface assembly according to claim 1, wherein for each of the at least one flight control surface the first portion and the second portion are spaced in a span direction of the respective flight control surface.

3. The flight control surface assembly according to claim 2, wherein for each of the at least one flight control surface the first portion is a first track and the second portion is a second track, wherein the first and second tracks extend from a main body of the flight control surface and are movably connected to the connection assembly.

4. The flight control surface assembly according to claim 1, wherein at least one of the at least one projecting element is integrally formed in one piece with the second end face or another portion of the second roller.

5. The flight control surface assembly according to claim 1, wherein at least one of the at least one projecting element is an element separate from the second roller and is retained in the fixed position on the second end face.

6. The flight control surface assembly according to claim 5, wherein the at least one projecting element, which is an element separate from the second roller, is a ball rotatably held in an associated recess in the second end face.

7. The flight control surface assembly according to claim 1, further comprising a detection unit connected to the detector associated with each of the at least one flight control surface and configured to receive the detection signal from each of the detectors and to evaluate the detection signals to determine if for one of the at least one flight control surface the width of the gap has exceeded the predetermined threshold and to provide a predetermined control signal if it is determined that for one of the at least one flight control surface the width of the gap has exceeded the predetermined threshold, which predetermined control signal indicates that the predetermined threshold has been exceeded by one of the flight control surfaces.

8. The flight control surface assembly according to claim 1, wherein the transmission mechanism of each of the at least one flight control surface comprises first and second wire-shaped elements coupled at one end to the associated flight control surface to move under tension together with the flight control surface upon movement thereof between the retracted and extended positions, such that the movement of the first wire-shaped element corresponds to the movement of the first portion of the flight control surface and the movement of the second wire-shaped element corresponds to the movement of the second portion of the flight control surface, and
   wherein the first wire-shaped element is guided at least partially around the first roller and the second wire-shaped element is guided at least partially around the second roller to effect the rotation of the first and second rollers.

9. The flight control surface assembly according to claim 8, wherein the transmission mechanism of each of the at least one flight control surface comprises a tensioning mechanism adapted to maintain the first and second wire-shaped elements under tension by biasing them towards a position corresponding to the retracted position.

10. The flight control surface assembly according to claim 9, wherein the tensioning mechanism comprises a first spring-loaded reel onto which the first wire-shaped element is reeled and a second spring-loaded reel onto which the second wire-shaped element is reeled.

11. The flight control surface assembly according to claim 10, wherein
   the first and second spring-loaded reels are rollers separate from the first and second rollers and the first and second rollers are located, along the length of the first and second wire-shaped elements, between the flight control surface and the first and second spring-loaded reels, or
   the first and second spring-loaded reels are constituted by the first and second rollers.

12. The flight control surface assembly according to claim 8, wherein the transmission mechanism of each of the at least one flight control surface further comprises a first deflection pulley and a second deflection pulley, wherein the first deflection pulley is arranged, along the length of the first wire-shaped element, between the flight control surface and the first roller such that the first wire-shaped element is guided at least partially around the first deflection pulley and extends between the flight control surface and the first deflection pulley in a chord direction of the flight control surface, and the second deflection pulley is arranged, along the length of the second wire-shaped element, between the flight control surface and the second roller such that the second wire-shaped element is guided at least partially around the second deflection pulley and extends between the flight control surface and the second deflection pulley in a chord direction of the flight control surface.

13. A wing of an aircraft comprising a main wing and a flight control surface assembly according to claim 1 mounted to the main wing by the connection assembly so as to effect the predetermined movement of the flight control surfaces with respect to the main wing between the retracted position and the extended position.

14. The wing according to claim 13,
wherein the flight control surface assembly is a flight control surface assembly configured to be mounted to a main wing of an aircraft and comprising:
at least one flight control surface having a first portion and a second portion spaced from each other;
a connection assembly configured for movably connecting the at least one flight control surface to a main wing of an aircraft, such that each of the at least one flight control surface is selectively movable in a predetermined movement between a retracted position and an extended position with respect to the main wing;
separately for each of the at least one flight control surface
a first roller and a second roller mounted rotatably and coaxially, wherein the first roller has a first end face and the second roller has a second end face facing the first end face with a gap between the first and second end faces;
a detector;
a biasing mechanism biasing the first and second rollers towards each other; and
a transmission mechanism coupled between the flight control surface and the first and second rollers such that a movement of the flight control surface between the retracted and extended positions is configured to cause the first and second rollers to rotate in such a manner that the rotation of the first roller corresponds to the movement of the first portion, the rotation of the second roller corresponds to the movement of the second portion and the first and second rollers rotate synchronously when the flight control surface carries out the predetermined movement,
wherein the first end face comprises a cam surface portion and the second end face comprises at least one projecting element arranged in a fixed position on the second end face and in contact with the cam surface portion, wherein the cam surface portion is shaped such that the width of the gap is minimum when the first and second rollers have a predetermined relative angular position corresponding to the predetermined movement and that the width of the gap continuously increases with an increasing deviation from the predetermined relative angular position,
wherein the detector is configured to provide a detection signal indicative of whether or not the width of the gap exceeds a predetermined threshold,
wherein the transmission mechanism of each of the at least one flight control surface comprises first and second wire-shaped elements coupled at one end to the associated flight control surface to move under tension together with the flight control surface upon movement thereof between the retracted and extended positions, such that the movement of the first wire-shaped element corresponds to the movement of the first portion of the flight control surface and the movement of the second wire-shaped element corresponds to the movement of the second portion of the flight control surface,
wherein the first wire-shaped element is guided at least partially around the first roller and the second wire-shaped element is guided at least partially around the second roller to effect the rotation of the first and second rollers,
wherein the transmission mechanism of each of the at least one flight control surface further comprises a first deflection pulley and a second deflection pulley, wherein the first deflection pulley is arranged, along the length of the first wire-shaped element, between the flight control surface and the first roller such that the first wire-shaped element is guided at least partially around the first deflection pulley and extends between the flight control surface and the first deflection pulley in a chord direction of the flight control surface, and the second deflection pulley is arranged, along the length of the second wire-shaped element, between the flight control surface and the second roller such that the second wire-shaped element is guided at least partially around the second deflection pulley and extends between the flight control surface and the second deflection pulley in a chord direction of the flight control surface, and
wherein for each of the flight control surfaces
the first deflection pulley is arranged such that the first wire-shaped element extends between the flight control surface and the first deflection pulley in the chord direction of the wing, and the first wire-shaped element extends between the first deflection pulley and the first roller along a neutral axis of the wing, and
the second deflection pulley is arranged such that the second wire-shaped element extends between the flight control surface and the second deflection pulley in the chord direction of the wing, and the second wire-shaped element extends between the second deflection pulley and the second roller along the neutral axis of the wing.

15. An aircraft comprising a wing according to claim 13.

* * * * *